United States Patent [19]

Maciejewski et al.

[11] Patent Number: 5,580,917
[45] Date of Patent: Dec. 3, 1996

[54] HYDROSTATICALLY DAMPING SHOCK AND VIBRATION ENERGY ABSORBING NON-VULCANIZABLE SILICONE ELASTOMER

[76] Inventors: Jeremi Maciejewski, Al. Niepodległości 142 Am.6, Warszawa 02-554; Antoni Kubicki, ul.J. Krasickiego 15-25, Przeworsk 37-200, both of Poland

[21] Appl. No.: 296,094

[22] Filed: Aug. 25, 1994

Related U.S. Application Data

[63] Continuation of Ser. No. 39,875, Mar. 30, 1993, abandoned.

[30] Foreign Application Priority Data

Dec. 21, 1992 [PL] Poland ........................................ 297095

[51] Int. Cl.$^6$ ........................................................ C08K 5/54
[52] U.S. Cl. .......................... 524/268; 524/432; 524/451; 525/477; 525/337; 525/377; 525/342; 528/43

[58] Field of Search ................................... 524/268, 432, 524/451; 525/477, 337, 342, 377; 528/43

[56] References Cited

U.S. PATENT DOCUMENTS 4,339,339  7/1982  Maciejewski .......................... 525/477

*Primary Examiner*—Mark D. Sweet
*Attorney, Agent, or Firm*—Lackenbach Siegel Marzullo Aronson & Greenspan, P.C.

[57] ABSTRACT

Hydrostatically damping, shock and vibration energy absorbing, non-vulcanisable silicone elastomer is composed of a methylphenylsilicone polymer in which as on the matrix a condensation of polydimethyl- or/and methylhydrosiloxane diols are condensed with reactive compounds of silicon, boron or nitrogen giving the viscous polymer appropriate elasticity coefficient by forming mobile hydrogen bonds. The elastomer according to the invention contains also fillers and lubricants.

25 Claims, No Drawings

HYDROSTATICALLY DAMPING SHOCK AND VIBRATION ENERGY ABSORBING NON-VULCANIZABLE SILICONE ELASTOMER

This application is a continuation, of application Ser. No. 08/039,875, filed Mar. 30, 1993 now abandoned.

The invention relates to hydrostatically damping, shock and vibration energy absorbing, non-vulcanisable elastomer. Elastomer of the kind is applied for filling energy absorbers, which substitute metallic springs and their systems connected with hydraulic dampers, and can be applied in a production of bump stops of railway cars, shock absorbers, automative suspensions, vibroinsulators and the like.

Known and applied in practice are metallic springs, which similarly to rubber, absorb energy, but dissipate it only to a very limited extent.

The polysiloxane composition known from the Polish patent specification No. 108635 is based on a complicated polymer with a boron atom, which is branched to form methyl-phenyl-vinyl-siloxane chains. Polymer of the kind is characterized by random structure and acquires appropriate elasticity coefficient in the course of the oxidation of vinylic groups and viscous properties in the course of plastification. Disadvantage of this composition is its excessive elasticity, lack of flowing properties and therefore limited damping.

French patent specification No. 2348401 discloses and elastomer composition, which is a mixture for vulcanization and has high elasiticty coefficient and limited damping properties. Moreover the composition of the kind contains colloidal silica and will harden upon storage, thus significantly changing properties of energy absorbers.

Polish patent specification No. 126182 describes mechanical energy absorbing polysiloxane composition, which is based on elastic, high molecular weight borosiloxane polymer, which acquires viscous properties in the course of simple mixing with high molecular weight methylphenylsilicone and dimethylsilicone polymer with different plasticizers. Disadvantage of the composition is the formation of polymer mixtures with limited miscibility, which results in heterogeneous compositions easily layering out upon storage. Another significant limitation of the composition is a known volume contraction upon cooling, a process which alters properties of energy absorbers, especially their static damping.

Now it has been unexpectedly discovered that hydrostatically damping, shock and vibration energy absorbing, non-vulcanisable composition according to the present invention is void of the above mentioned disadvantages.

Thus by one aspect of the invention there is provided a process in which viscous, methylphenylsilicone polymers acquire appropriate elasticity coefficient without vulcanization in the course of forming an elastic polymer as in the matrix, in the space between chains, in the region between phenyl groups or blocks of phenyl groups. The elastic polymer is formed in a process of condensation giving in a viscous polymer an elastic suitably tangled polymer.

Further it has been discovered that condensation of polydimethylsiloxane diols or/and polymethylhydrosiloxane diols in methylphenylsiloxane with reactive compounds of silicon, boron and nitrogen produces intrinsically tangled chains with OH groups capable of forming hydrogen bonds with oxygen present in methylphenylsiloxane chains.

Further it has been discovered that appropriate elasticity coefficient can be acquired by methylphenylsilicone polymers having statistical distribution of segments of diphenyl groups or/and methylphenyl groups which form blocks containing from 1 to 5 silicon atoms, and moreover having a total content of phenyl groups from 3% to 25% by weight and the molecular weight from 150000 to 800000. As is understood, silicone rubbers having both methyl and phenyl substituent groups on the polymer chains are called PMQ gums. In one variant, the methylphenylsilicone polymer is a PMQ gum selected from the group consisting of poly methyl phenyl siloxane gums, dimethyl polysiloxane gums comprising phenyl groups, and mixtures thereof. Further, the total amount of methyltriflouropropylsilicone oil, filler, lubricant, thermal conductor, and compressible silicone oil do not exceed about ten parts by weight of elastomer.

By another aspect of the invention there is provided a process permitting precise manipulation with the properties of mechanical energy absorbers comprising adding to the polymer, obtained according to the present invention, fillers, lubricants, thermal conductors and compressible oils in an amount of 10 parts by weight.

It has been discovered that condensation of polydimethyl-or/and methylhydrosiloxane diols is preferably carried out in the temperatures up to 150° C. with 3% of fatty acids in relation to the above mentioned siloxane diols.

It has been found that preferred polydimethylsiloxane diols have viscosity from 30 to 500 mPas /25° C./, methylhydrosiloxane diols have viscosity from 5 to 150 mPas /25° C./ and are used separately or as a mixture amounting to 10 parts by weight for 1 part by weight of the polymer. Preferred silicon compound is methyltriacetoxysilane, preferred boron compound is boron hydroxide and preferred nitrogen compound is tolylene diisocyanate and they are used separately or as a mixture in an amount triply stoichiometric.

The elastomer according to the present invention preferably contains up to 5 parts by weight of fillers e.g. talc; up to 0.1 part by weight of thermal conductor of zinc oxide type; up to 0.05 parts by weight of lubricants e.g. powdered polytetrafluoroethylene or/and molybdenum disulfide; 0.05 parts by weight of lubricating oil e.g. methyltrifluoropropylsilicone oil having viscosity of 500 mPas /25° C./; and up to 0.5 parts by weight of compressible methylsilicone oil having viscosity of 5000 Pas /25° C./.

The elastomer according to the invention intended for use at extremely low temperatures desirably contains methylphenylsiloxane having 10% by weight of phenyl groups and has a molecular weight from 300,000 to 600,000, and intended for use at high temperatures 20% by weight of phenyl groups and has a molecular weight from 400,000 to 800,000.

Thus by another aspect of the invention there is provided an elastomer, which applied in mechanical energy absorbers provides simultaneously in one device properties of a spring and hydraulic damper. Other properties of the elastomer include an increased modulus of elasticity.

EXAMPLE 1

To a mixer it was introduced 95 kg of methylphenylsilicone polymer containing 10% by weight of phenyl groups, having a molecular weight of 400000; 5 kg of polydimethylsiloxane diol; 0.1 kg of boron hydroxide, 0.1 kg of fatty acids. The components were stirred for 2 hr and then the mixture was heated up to 100° C. and the volatile components were removed under vacuum. After 4 hr of heating an elastic polymer was obtained, to which it was added 100 kg of talc, silicone oil having a viscosity of 5000 Pas /25° C./, 1 kg of zinc oxide, 1 kg of teflon powder, 0.5 kg of molybdenum disulfide and 1 kg of silicone oil having a viscosity of 300 mPas /25° C./. After blending of components an elastomer is obtained, which is used for filling the bump stops of railway cars.

EXAMPLE 2

To a mixer it was introduced 70 kg of methylphenylsilicone polymer containing 10% by weight of phenyl groups, having a molecular weight of 500000; 30 kg of polydimethylsiloxane diol having a viscosity of 100 mPas /25° C./; 0.1 kg of fatty acids; 0.3 kg or boron hydroxide, which can be dissolved in methanol to facilitate dispergation. The stirred mixture was heated up to 100 C. for 4 hr under vacuum. To the obtained polymer it was added 100 kg of talc; 50 kg of silicone oil having a viscosity of 8000 Pas /25° C./; 3 kg of graphite; 1 kg of silicone oil having a viscosity of 300 mPas ./25° C./ and the mixture was stirred for 3 hr. The obtained elastomer is used to fill under pressure the bump stops of railway cars, shock absorbers of railway cars couplers and other devices of the kind. In one variant, the reactive compounds in the present invention are those of silicon, boron, or nitrogen used separately or as a mixture. By way of example, the silicon compound is methyltriacetoxysilane, and the reactive nitrogen compound is tolylene isocynate. Reactive compounds are further selected from the group consisting of methyltriacetoxysilane, tolyene diisocyanate, and mixtures thereof.

While only a few, preferred embodiments of the invention have been described hereinabove, those of ordinary skill in the art will recognize that the embodiments may be modified and altered without departing from the central spirit and scope of the invention. Thus, the preferred embodiments described hereinabove are to be considered in all respects illustrative and not restrictive, the scope of the invention being indicated by the appended claims, rather than by the foregoing description, and all changes that come within the meaning and range of equivalency of the claims are intended to be embraced herein.

We claim:

1. A hydrostatically damping, shock and vibration energy absorbing, non-vulcanisable composition which is the product of the process wherein
   a) a siloxane diol, selected from the group consisting of polydimethyl- and polymethylhydrosiloxane diols, and a reactive compound, based upon silicon, boron or nitrogen, which is capable of undergoing a condensation reaction with the diol, said reactive compound selected from the group consisting of methyltriacetoxysilane, tolyene diisocyanate, and mixtures thereof, are admixed with a methylphenylsilicone polymer; and,
   b) once admixed with the methylphenylsilicone polymer, the diol and the reactive compound are caused to react, to yield a condensation product thereof;
   said condensation product of the reaction of the diol and the reactive compound being formed around the methylphenylsilicone polymer, thereby yielding the elastomeric composition.

2. The composition of claim 1 wherein the reaction of the diol and the reactive compound is carried out at temperatures up to about 150° C. in the presence of about 3% of fatty acid in relation to the diol.

3. The composition of claim 1 wherein the siloxane diol is selected from group consisting of polydimethylsiloxane diols having a viscosity of from 30 to 500 mPas at 25° C. and methylhydrosiloxane diols having viscosity of from 5 to 150 mPas at 25° C.

4. The composition of claim 1 wherein the siloxane diol is used in an amount which is about 0.01 to 10 parts by weight for each 1 part by weight of methylphenylsilicone polymer.

5. The composition of claim 1 wherein the reactive compound is used in an amount that is triply stoichiometric with respect to the siloxane diol.

6. A composition in accordance with claim 1, additionally comprising up to 5 parts by weight of talc; up to 0.1 parts by weight of zinc oxide; up to 0.05 parts by weight of a lubricant selected from the group consisting of polytetrafluroroethylene and molybdenum disulfide; methyltrifluoropropylsilicone oil having a viscosity of about 500 mPas at 25° C.; and up to 0.5 parts by weight of a compressible methylsilicone oil having a viscosity of about 5,000 Pas at 25° C.

7. A hydrostatically damping, shock and vibration energy absorbing, non-vulcanisable composition which is the product of the process wherein:
   a) a siloxane diol, selected from the group consisting of polydimethyl- and polymethylhydrosiloxane diols, and a reactive compound, selected from the group consisting of boron hydroxide, boric acid, methyltriacetoxysilane, and tolyene diisocyanate, are admixed with a methylphenylsilicone polymer, said methylphenylsilicon polymer having end blocking groups not entering into a condensation reaction with said reactive compound; and,
   b) once admixed with the methylphenylsilicone polymer, the diol and the reactive compound are caused to react, to yield a condensation product thereof and a viscous mixture mixture, said viscous mixture comprising said condensation product and said methylphenylsilicone polymer;
   said condensation product of the reaction of the diol and the reactive compound being formed around the methylphenylsilicone polymer.

8. A hydrostatically damping, shock and vibration energy absorbing, non-vulcanisable composition which is the product of the process wherein:
   a) polydimethylsiloxanediol and a boron compound selected from the group consisting of boric acid and boron hydroxide are admixed with a methylphenylsilicone polymer, said methylphenylsilicone polymer having end blocking groups not entering into a condensation reaction with said boron compound or said diol; and,
   b) once admixed with the methylphenylsilicone polymer, the siloxanediol and the boron compound are caused to react, to yield a condensation product thereof and a viscous mixture, said viscous mixture comprising said condensation product and said methylphenylsilicone polymer;
   said condensation product of the reaction of the diol and the reactive compound is formed around the methylphenylsilicone polymer.

9. The composition of claim 8 wherein the reaction of the diol and the reactive compound is carried out at temperatures up to about 150° C. in the presence of about 3% of fatty acid in relation to the diol.

10. The composition of claim 8 wherein the siloxane diol is selected from group consisting of polydimethylsiloxane diols having a viscosity of from 30 to 500 mPas at 25° C. and methylhydrosiloxane diols having a viscosity of from 5 to 150 mPas at 25° C.

11. The composition of claim 8 wherein the siloxane diol is used in an amount which is about 0.01 to 10 parts by weight for each 1 part by weight of the methylphenylsilicone polymer.

12. The composition of claim 8 wherein the reactive compound is used in an amount that is triply stoichiometric with respect to the siloxane diol.

13. A composition in accordance with claim 8, additionally comprising up to 5 parts by weight by weight of talc; up to 0.1 parts by weight by weight of zinc oxide; up to 0.05 parts by weight by weight of a lubricant selected from the group consisting of polytetrafluroroethylene and molybdenum disulfide; methyltrifluoropropylsilicone oil having a viscosity of about 500 mPas at 25° C.; and up to 0.5 parts by weight by weight of a compressible methylsilicone oil having a viscosity of about 5,000 Pas at 25° C.

14. A process from making a hydrostatically damping, shock and vibration energy absorbing, non-vulcanisable composition wherein:

a) a siloxane diol, selected from the group consisting of polydimethyl- and polymethylhydrosiloxane diols, and a reactive compound, selected from the group consisting of boron hydroxide, methyltriacetoxysilane, tolyene diisocyanate, are admixed with a methylphenylsilicone polymer; and, b) once admixed with the methylphenylsilicone polymer, the diol and the reactive compound are caused to react, to yield a condensation product thereof;

whereby the condensation product of the reaction of the diol and the reactive compound is formed within the methylphenylsilicone polymer, thereby yielding the elastomeric composition having a freezing temperature less than minus forty degrees Celsius at atmospheric pressure.

15. A process for making a hydrostatically damping, shock and vibration energy absorbing, non-vulcanisable composition wherein:

a) polydimethylsiloxanediol and a boron compound selected from the group consisting of boric acid and boron hydroxide are admixed with a methylphenylsilicone polymer, said methylphenylsilicon polymer having end blocking groups not entering into a condensation reaction with said boron compound; and, b) once admixed with the methylphenylsilicone polymer, the siloxanediol and the boron compound are caused to react, to yield a condensation product thereof, and a viscous mixture, said viscous mixture comprising said condensation product and said methylphenylsilicone polymer;

said condensation product of the reaction of the diol and the reactive compound being formed around the methylphenylsilicone polymer.

16. The composition of claim 1, in which the methylphenylsilicone polymer is a PMQ gum selected from the group consisting of poly methyl phenyl siloxane gums, dimethyl polysiloxane gums comprising phenyl groups, derivatives thereof, and mixtures thereof.

17. The composition of claim 8, in which the methylphenylsilicone polymer is a PMQ gum selected from the group consisting of poly methyl phenyl siloxane gums, dimethyl polysiloxane gums comprising phenyl groups, derivatives thereof, and mixtures thereof.

18. The process of claim 14, in which the methylphenylsilicone polymer is a PMQ gum selected from the group consisting of poly methyl phenyl siloxane gums, dimethyl polysiloxane gums comprising phenyl groups, derivatives thereof, and mixtures thereof.

19. The process of claim 15, in which the methylphenylsilicone polymer is a PMQ gum selected from the group consisting of poly methyl phenyl siloxane gums, dimethyl polysiloxane gums comprising phenyl groups, derivatives thereof, and mixtures thereof.

20. A hydrostatically damping, shock absorbing and vibration energy absorbing non-vulcanizable silicone elastomer, comprising:

a) a diol selected from the group consisting of dimethylpolysiloxane, methylhydrogenpolysiloxane, and mixtures thereof, and a polymethylphenylsiloxane PMQ gum having end blocking units non-reactive chemically, and resistant to known methods of vulcanization are mixed to create a homogeneous mixture, said PMQ gum not entering into a condensation reaction with said diol;

b) a cross-linking agent introduced to the homogeneous mixture after which the diol and the cross-linking agent are caused to react to yield a condensation product of viscoelastic PMQ gum to obtain a viscous suspension; and, c) a compound selected from the group consisting of fillers, lubricants, thermal conductors, compressible silicone oils, and mixtures thereof, are further introduced to the viscous suspension;

said condensation product of the reaction of the diol and the cross-linking agent being formed around the PMQ gum.

21. The elastomer of claim 20, in which the PMQ gum comprises phenyl groups in the range of about 3 percent to about 25 by weight of the PMQ gum.

22. The elastomer of claim 20, in which said diol is at least one polymer selected from the group consisting of a polymer of viscosity from about 30 to about 500 m Pas at about 25° C., a polymer of viscosity from about 5 to about 150 m Pas at about 25° C., and mixtures thereof, and wherein said diols are added from about 0.01 to about 10 parts by weight to each one part by weight of said PMQ gum.

23. The elastomer of claim 20, in which said cross-linking agents are selected from the group consisting of methyltriacetoxysilane, boric acid, boron hydroxide, tolylene diisocyanate, and mixtures thereof, and wherein said cross-linking agents are added in amounts about three times greater than of stoichiometric amounts of said diols.

24. The elastomer of claim 20, in which the process for making said elastomer is conducted at a temperature up to about 150 degrees C.

25. The elastomer of claim 20, further including to about each one part by weight of said viscoelastic PMQ gum is added up to about 0.05 parts by weight of methyltriflouropropylsilicone oil of viscosity of about 500 mPas at about 25° C.; and, in which said filler comprises up to about 5 parts by weight of talc; and, said lubricant comprises up to about 0.05 parts by weight of a compound selected from the group consisting of powdered polytretaflourethylene, molybdenum disulfide, and mixtures thereof, said thermal conductor comprises up to about 0.1 part by weight of zinc oxide, said compressible silicone oil comprises up to about 0.5 parts by weight of dimethylsilicone oil having viscosity of about 5000 Pas at about 25° C., whereby the total amount of methyltriflouropropylsilicone oil, filler, lubricant, thermal conductor, and compressible silicone oil do not exceed about ten parts by weight of elastomer.

* * * * *